United States Patent
Cruz et al.

(10) Patent No.: US 8,230,353 B2
(45) Date of Patent: Jul. 24, 2012

(54) ITERATIVE DEVELOPMENT OF SERVICES FROM WSDL

(75) Inventors: Roderico A. Cruz, Tracy, CA (US); Christopher B. Webster, Dublin, CA (US); Nam Tuan Nguyen, Pleasant Hill, CA (US); Srividhya Narayanan, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 924 days.

(21) Appl. No.: 11/870,817

(22) Filed: Oct. 11, 2007

(65) Prior Publication Data

US 2009/0100341 A1    Apr. 16, 2009

(51) Int. Cl.
*G06F 3/00* (2006.01)
*G06F 9/44* (2006.01)

(52) U.S. Cl. ......... 715/760; 717/119; 715/762; 715/765

(58) Field of Classification Search .................. 715/760, 715/762, 765; 717/119
See application file for complete search history.

(56) References Cited

U.S. PATENT DOCUMENTS

| | | | |
|---|---|---|---|
| 6,509,906 B1* | 1/2003 | Awe et al. | 345/619 |
| 7,395,523 B2* | 7/2008 | Bates et al. | 717/112 |
| 7,457,815 B2* | 11/2008 | Hsu et al. | 1/1 |
| 7,917,584 B2* | 3/2011 | Arthursson | 709/205 |
| 2007/0073771 A1* | 3/2007 | Baikov et al. | 707/104.1 |
| 2007/0073851 A1* | 3/2007 | Baikov et al. | 709/220 |
| 2009/0106398 A1* | 4/2009 | Seaman et al. | 709/219 |
| 2009/0157627 A1* | 6/2009 | Arthursson | 707/3 |
| 2010/0077070 A1* | 3/2010 | Baikov et al. | 709/223 |

* cited by examiner

*Primary Examiner* — Ryan Pitaro
(74) *Attorney, Agent, or Firm* — Brooks Kushman P.C.

(57) ABSTRACT

Iterative development of services may be provided by simultaneously developing service implementations and the corresponding WSDL description. At least one web service may be specified by WSDL code accepted as input. Output code may be created corresponding to each of the inputted web service. A graphical display item may be displayed corresponding to each inputted web service. The WSDL code, output code, and graphical display may be updated to reflect user input modifying a web service. A WSDL document and/or an output code document may be generated including modified web services.

18 Claims, 8 Drawing Sheets

```
<message name="requestLoanMessage">
    <part name="requestPart" element="tns:processApplication"/>
</message>
<message name="requestLoanResponseMessage">
    <part name="responsePart" element="tns:processApplicationResponse"/>
</message>

<portType name="IRequestLoan">
    <operation name="requestLoan">
        <input name="input" message="tns:requestLoanMessage"/>
        <output name="output" message="tns:requestLoanResponseMessage"/>
    </operation>
</portType>

<binding name="SoapBinding" type="tns:IRequestLoan">
    <soap:binding transport="http://schemas.xmlsoap.org/soap/http" style="document">
    <operation name="requestLoan">
    <input name="input">
        <soap:body use="literal"/>
    </input>
    <output name="output">
        <soap:body use="literal"/>
    </output>
</operation>
```

Fig. 2b

```
@WebService(serviceName = "LoanRequestService", portName = "LoanRequestPortName",
    endpointInterface = "com.sun.jbi.blueprints.loanrequestor.IRequestLoan",
    targetNamespace = "http://loanRequestor.blueprints.jbi.sun.com/",
    wsdLocation = "WEB~INF/wsdl/LoanService/LoanRequestor.wsdl")
public class LoanService implements IRequestLoan {                    ⎯ 82 public ProcessApplicationResponse requestLoan(ProcessApplication requestPart) {
        ProcessApplicationResponse response = new ProcessApplicationResponse();
        if (requestPart.getAmountRequested() > requestPart.getAnnualSalary() / 3) {
            response.setReturn("Approved");
        }
        else {                                                            ⎯ 84
            response.setReturn("Denied");
        }
        return response;
    }
}
```

```xml
<message name="requestQuoteMessage">
    <part name="requestQuotePart" element="tns:requestQuote"/>
</message>
<message name="requestQuoteResponseMessage">
    <part name="requestQuoteResponsePart" element="tns:requestQuoteResponse"/>
</message>
<portType name="IRequestLoan">
    <operation name="requestLoan">
        <input name="input" message="tns:requestLoanMessage"/>
        <output name="output" message="tns:requestLoanResponseMessage"/>
    </operation>
    <operation name="requestQuote">
        <input name="requestQuote" message="tns:requestQuoteMessage"/>
        <output name="requestQuoteResponse" message="tns:requestQuoteResponseMessage"/>
    </operation>
</portType>

<binding name="SoapBinding" type="tns:IRequestLoan">
    <soap:binding transport="http://schemas.xmlsoap.org/soap/http" style="document"/>
    <operation name="requestLoan">
        <input name="input">
            <soap:body use="literal"/>
        </input>
        <output name="output">
            <soap:body use="literal"/>
        </output>
    </operation>
    <operation name="requestQuote">
        <soap:operation soapAction=""/>
        <input xmlns:soap="http://schemas.xmlsoap.org/wsdl/soap/">
            <soap:body use="literal"/>
```

Fig. 3c

```
@WebService(serviceName = "LoanRequestorService", portName = "LoanRequestorPortName",
    endpointInterface = "com.sun.jbi.blueprints.loanrequestor.IRequestLoan",
    targetNamespace = "http://loanRequestor.blueprints.jbi.sun.com/",
    wsdlLocation = "WEB-INF/wsdl/LoanService/LoanRequestor.wsdl")
public class LoanService implements IRequestLoan { public ProcessApplicationResponse requestLoan(ProcessApplication requestPart) {
        ProcessApplicationResponse response = new ProcessApplicationResponse();
        if(requestPart.getAmountRequested() > requestPart.getAnnualSalary() / 3 ) {
            response.setReturn("Approved");
        }
        else {
            response.setReturn("Denied");
        }
        return response;                                                    122
    } public java.lang.String requestQuote(java.lang.String socialSecurityNumber,
            java.lang.String applicantName, java.lang.String applicationAddress,
            java.lang.String applicantEmailAddress, int applicantAge,
            java.lang.String applicantGender, float annualSalary, float amountRequested) {
        //TODO implement this method
        throw new UnsupportedOperationException("Not implemented yet.");
    }
}
```

```
<message name="applyLoanMessage">
    <part name="requestPart" element="tns:processApplication"/>
</message>
<message name="applyLoanResponseMessage">
    <part name="responsePart" element="tns:processApplicationResponse"/>
</message>
<message name="requestQuoteMessage">
    <part name="requestQuotePart" element="tns:requestQuote"/>
</message>
<message name="requestQuoteResponseMessage">
    <part name="requestQuoteResponsePart" element="tns:requestQuoteResponse"/>         142
</message>
<portType name="IRequestLoan">
    <operation name="applyLoan">
        <input name="input" message="tns:applyLoanMessage"/>
        <output name="output" message="tns:applyLoanResponseMessage"/>
    </operation>
    <operation name="requestQuote">
        <input name="requestQuote" message="tns:requestQuoteMessage"/>
        <output name="requestQuoteResponse" message="tns:requestQuoteResponseMessage"/>
    </operation>
</portType>

<binding name="SoapBinding" type="tns:IRequestLoan">
    <soap:binding transport="http://schemas.xmlsoap.org/soap/http" style="document"/>
    <operation name="requestLoan">
        <input name="input">
            <soap:body use="literal"/>
        </input>
        <output name="output">
            <soap:body use="literal"/>
        </output>
```

*Fig. 4b*    140

```
@WebService(serviceName = "LoanRequestorService", portName = "LoanRequestorPortName",
    endpointInterface = "com.sun.jbi.blueprints.loanrequestor.IRequestLoan",
    targetNamespace = "http://LoanRequestor.blueprints.jbi.sun.com/",
    wsdlLocation = "WEB-INF/wsdl/LoanService/LoanRequestor.wsdl")         152
public class LoanService implements IRequestLoan { public ProcessApplicationResponse applyLoan(ProcessApplication requestPart) {
        ProcessApplicationResponse response = new ProcessApplicationResponse();
        if (requestPart.getAmountRequested() > requestPart.getAnnualSalary() / 3) {
            response.setReturn("Approved");
        }
        else {
            response.setReturn("Denied");
        }
        return response;
    }
```

ITERATIVE DEVELOPMENT OF SERVICES FROM WSDL

BACKGROUND OF THE INVENTION

1. Field of the Invention

The present invention relates to tools and methods for developing web services.

2. Background Art

A service-oriented architecture (SOA) is based on functional units known as services. These services are typically provided by self contained code modules that may be executed remotely in a distributed computing environment, such as is provided by the Internet. The services are described a language, such as Web Services Description Language (WSDL). The term WSDL will be used throughout to describe any such service descriptive language.

In SOA, services are typically created by first establishing a contract or interface between interested parties. This contract often describes the messages that are going to be sent and received as well as the manner by which these messages are to be exchanged. This contract may be written as a WSDL document.

Some integrated development environments (IDEs) provide facilities for creating web services from WSDL. However, these IDEs assume that the WSDL is final and not subject to further change. Often, in actual development, this is not the case, as the WSDL description is likely to change and evolve together with the implementation of the service. Current tools do not support this realistic dynamic workflow environment.

SUMMARY OF THE INVENTION

The present invention provides iterative development of services by simultaneously developing service implementations and the corresponding WSDL description.

In one embodiment of the present invention, a system for iterative development of services is provided. Memory holds a WSDL model and a Java model. A user interface provides output to and accepts input from a user. Control logic constructs the WSDL model based on a WSDL document. For each service specified in the WSDL model, a corresponding service may be constructed in the Java model and a display item may be generated on the user interface. For each service entry made by the user in the user interface, the corresponding service in the WSDL model and the Java model may be updated. A Java document may be produced from the Java model and an updated WSDL document may be produced from the WSDL model.

The user interface may include graphical representations of operations and data structures provided by each specified service. The user interface may accept user input defining data from existing XML schema. Schema elements selected by the user may be bound to Java language artifacts.

The Java model may be updated based on changes made to the Java document. The control logic may then update at least one corresponding service in the WSDL model and at least one corresponding user interface display item based on the updated Java. Similarly, the WSDL model may be updated based on changes made to the WSDL document. The control logic may then update at least one corresponding service in the Java model and at least one corresponding user interface display item based on the updated WSDL model.

A method for iteratively developing web services is also provided. At least one web service specified by WSDL code may be accepted as input. Output code corresponding to each of the inputted web service may be created. A graphical display item may be displayed corresponding to each inputted web service. The WSDL code, output code, and graphical display may be updated to reflect user input modifying a web service. A WSDL document and/or an output code document may be generated including modified web services.

The above features, and other features and advantages of the present invention are readily apparent from the following detailed descriptions thereof when taken in connection with the accompanying drawings.

BRIEF DESCRIPTION OF THE DRAWINGS

FIGS. 3A-D are schematic diagrams illustrating a service addition form, design view, WSDL view, and Java view, respectively, for operation addition according to an embodiment of the present invention;

FIGS. 4A-C are schematic diagrams illustrating a graphical user interface, WSDL view, and Java view, respectively, for name change operation according to an embodiment of the present invention.

DETAILED DESCRIPTION OF THE PREFERRED EMBODIMENT(S)

Figure 1:
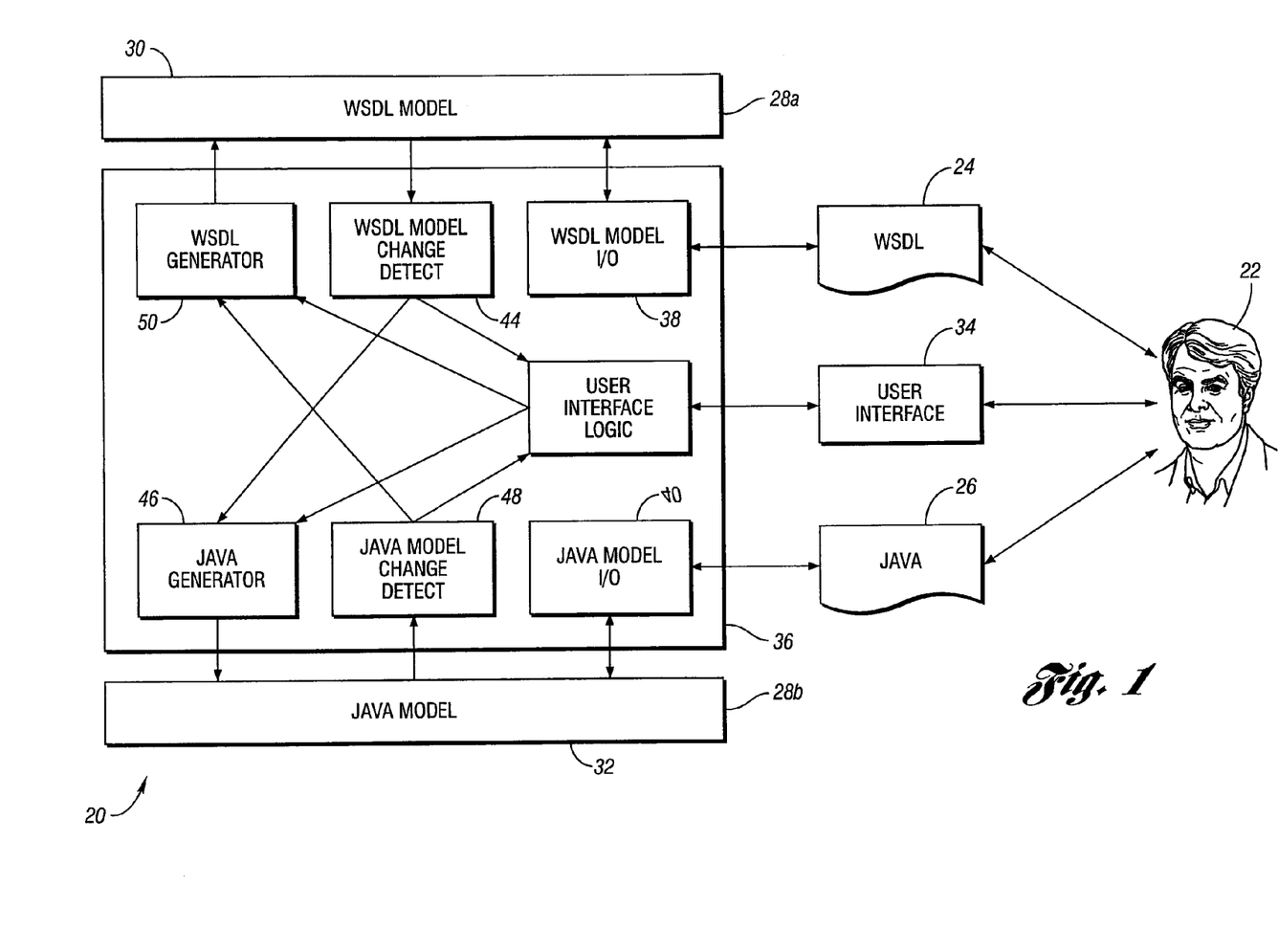
FIG. 1 is a block diagram illustrating a service development system according to an embodiment of the present invention.

Referring now to FIG. 1, a block diagram illustrating a service development system according to an embodiment of the present invention is shown. A software development system, shown generally by 20, assists user 22 in developing services. These services are typically implemented in self contained modular code which may be executed in a distributed network such as provided by the Internet. For example, this code may provide operations for services available through the World Wide Web.

In the exemplary system 20 shown, the service and its interfaces are specified in WSDL document 24, which may be embodied as one or more electronic file, paper printout, and the like. One or more documents 26 provides code implementing the specified service. This output code is in a computer readable or compilable language such as, for example, Java. Document 26 may be one or more electronic file, paper printout, and the like.

System 20 assists user 22 in iteratively developing services from a WSDL description by allowing the service implementation to evolve together with the WSDL description. This is achieved by synchronizing the contents of programming artifacts with the WSDL description through the use of live models held in memory 28. User 22 is able to change either the service implementation or the WSDL description and these changes are automatically propagated to the other representative form.

System 20 includes WSDL model 30 held in memory 28a and Java (output) model 32 held in memory 28b. Memory 28 may be computer memory associated with a computer processor executing computer software implementing the operations of the present invention, as is known in the art. Memories 28a and 28b may be found in the same physical storage device or in separate physical storage devices. WSDL model 30 is associated with WSDL document 24 and may be constructed, for example, using some or all of the WSDL statements in WSDL document 24. Likewise, Java model 32 is associated with Java document 26 and may be constructed, for example, using some or all of the Java statements in Java document 26. Alternatively, either or both of WSDL model and Java model may be implemented using an intermediate language that is translated to and from WSDL and Java, respectively. In one embodiment of the present invention, WSDL model 30 and Java model 32 may be displayed on user interface 34 observable by user 22. In addition, user interface 34 accepts input from user 22 for modifying one or both of WSDL model 30 and Java model 32. User interface 34 may be, for example, a computer monitor or other display together with a keyboard and a pointing device such as a mouse, pad, trackball, joy stick, and the like. As will be recognized by one of ordinary skill in the art, other forms of user interfaces are possible within the spirit and scope of the present invention.

System 20 includes logic elements 36 for executing operations implementing the present invention. Logic elements 36 may be implemented, for example, as software executing on a processor, not shown for clarity. Logic elements 36 may be placed or otherwise represented on any computer readable medium for loading into and execution by a general purpose computer. Other implementations are possible within the scope of the present invention, including a special purpose computer, custom or semicustom integrated circuits, discrete components, and the like, in any combination of one or more, either in one location or distributed.

WSDL model input/output logic 38 reads in WSDL document 24 and generates WSDL model 30. WSDL model input/output logic 38 may also generate WSDL document 24 from WSDL model 30. Similarly, Java model input/output logic 40 generates Java document 26 from Java model 32 and may also generate Java model 32 by reading in Java document 26. Either or both of WSDL model 30 and Java model 32 may also be created or modified by user 22 through user interface 34 and user interface logic 42.

WSDL model change detect logic 44 detects changes in WSDL model 30 such as, for example, if a new WSDL document 24 is read in by WSDL model input/output logic 38 or if WSDL document 24 is modified by user 22. WSDL model change detect logic 44 notifies user interface logic 42, which updates any corresponding display on user interface 34. WSDL model change detect logic also notifies Java generator 46, which implements corresponding updates in Java model 32. Java model change detect logic 48 detects changes in Java model 32 such as, for example, if Java document 26 is modified by user 22. Java model change detect logic 48 notifies user interface logic 42, which updates any corresponding display on user interface 34. Java model change detect logic 48 also notifies WSDL generator 50, which implements corresponding updates in WSDL model 30. User 22 may also modify WSDL or Java representations through user interface 34. User interface logic 42 detects these changes and notifies WSDL Java generator 46 and WSDL generator 50, which update Java model 32 and WSDL model 30, respectively.

Figure 2A:
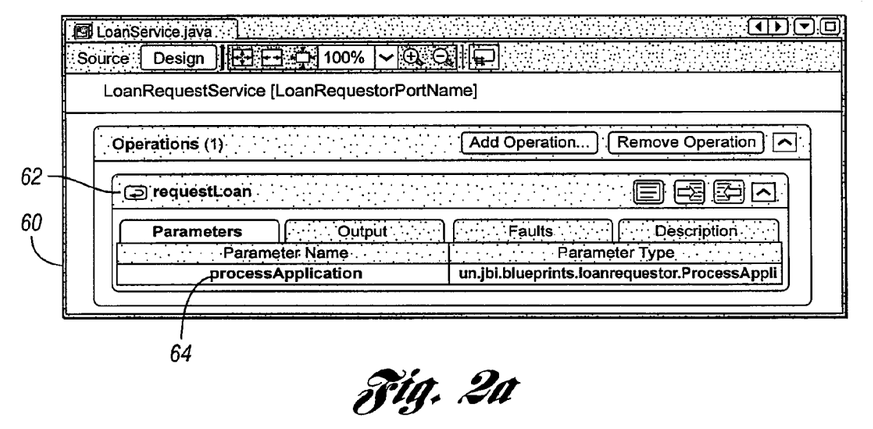
FIGS. 2A-C are schematic diagrams illustrating a graphical user interface, WSDL view, and Java view, respectively, for web service creation according to an embodiment of the present invention.
Figure 2B:
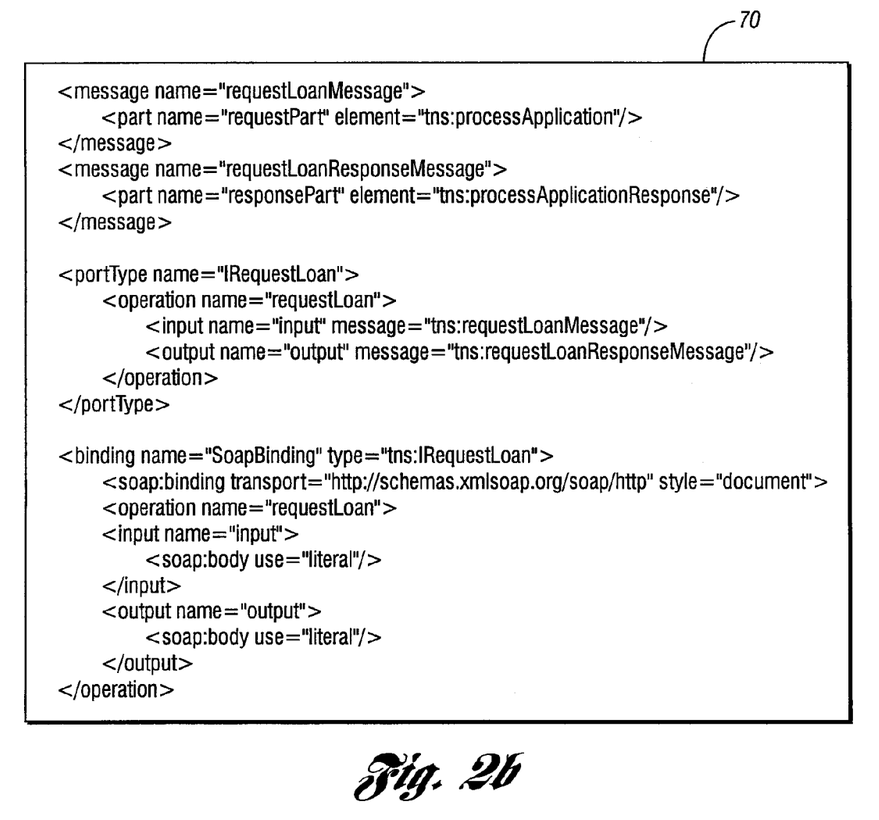
Figure 2C:
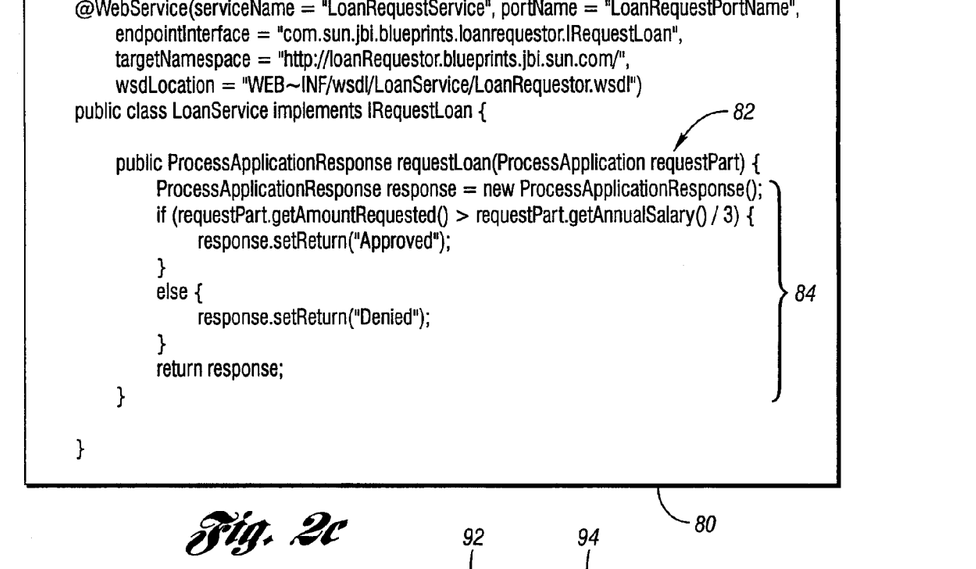

Referring now to FIGS. 2A-C, schematic diagrams illustrating a graphical user interface, WSDL view, and Java view, respectively, for web service creation according to an embodiment of the present invention are shown. Referring first to FIG. 2A, graphical design view 60 after creation of a service from an existing WSDL document is shown. Design view 60 indicates that the service has a single operation, "requestLoan," indicated by 62, which has a single parameter, "processApplication," indicated by 64. Referring now to FIG. 2B, WSDL view 70 provides the user with a view of the WSDL code for the "requestLoan" operation. Referring now to FIG. 2C, Java view 80 provides the user with a view of the Java code resulting from reading the WSDL document. This Java code includes a shell created for the "requestLoan" operation, shown generally by 82, into which has been entered implementation code 84.

Figure 3A:
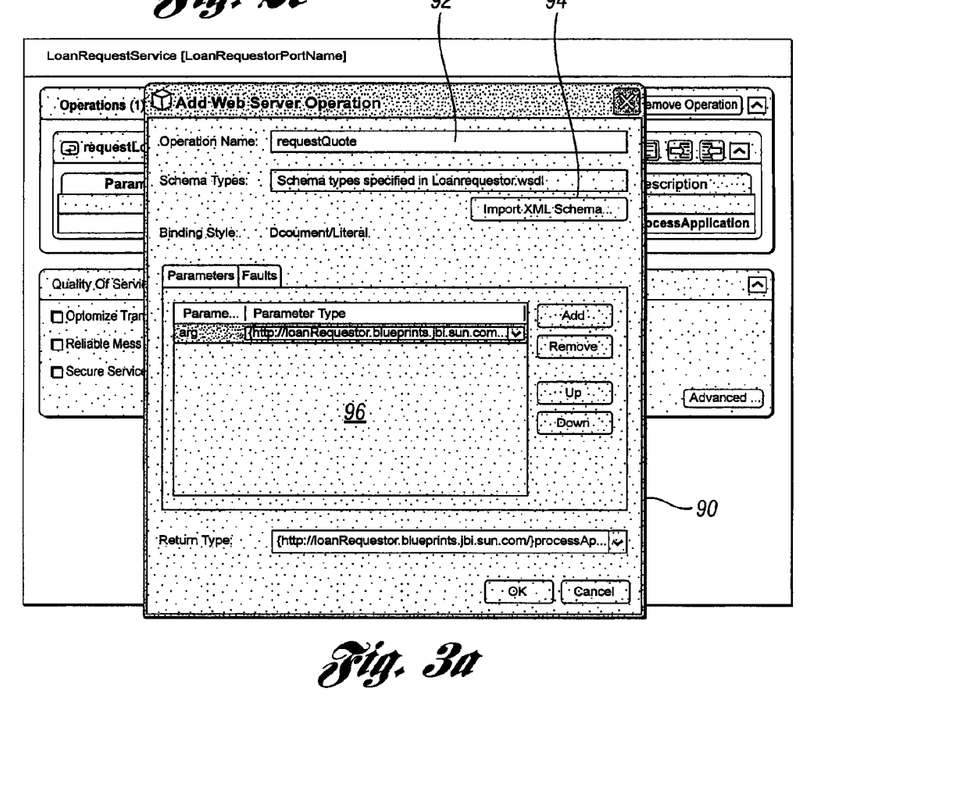
Figure 3B:
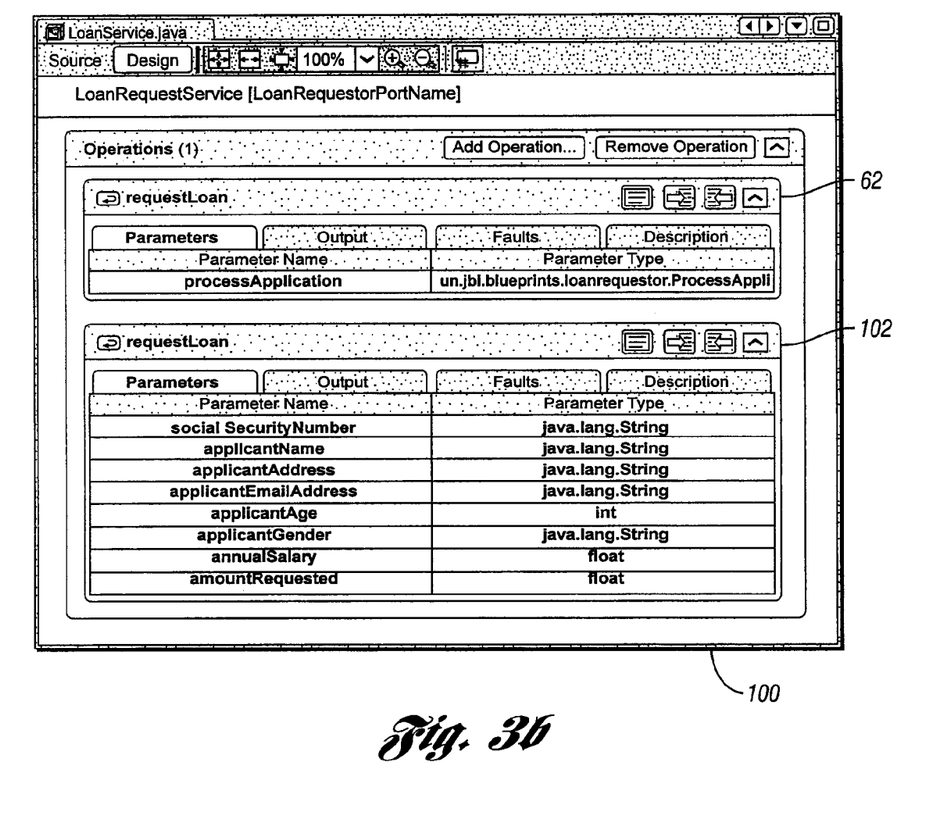
Figure 3C:
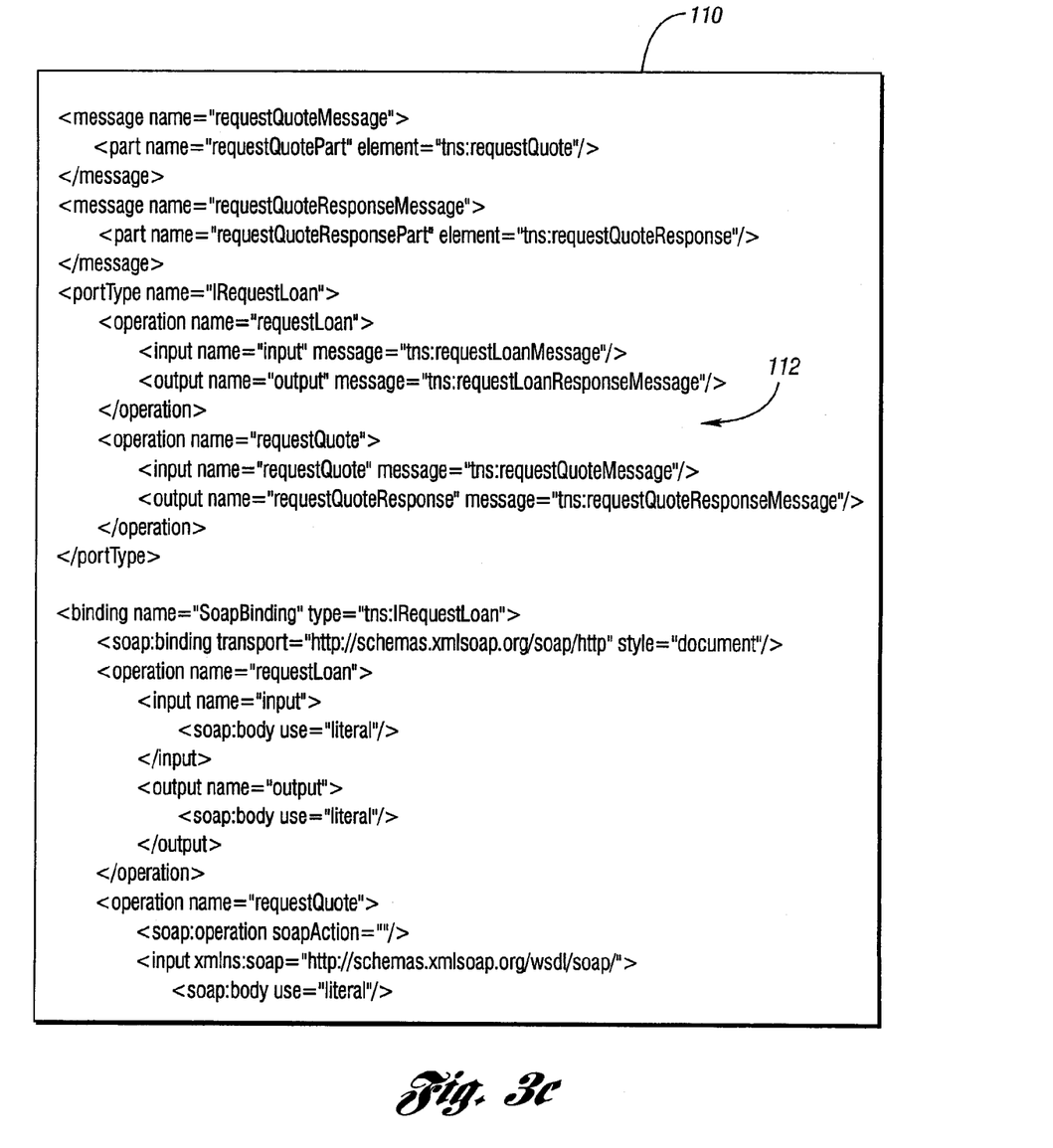

Referring now to FIGS. 3A-D, schematic diagrams illustrating a service addition form, design view, WSDL view, and Java view, respectively, for operation addition according to an embodiment of the present invention are shown. Referring to FIG. 3A, service addition form 90 is invoked for adding operations to the service. Operation name box 92 allows the new operation to be named such as, in this example, "requestQuote." Import XML Schema button 94 provides the ability to select XML schema types and the resulting binding style (e.g., RPC, document, and the like). Parameter and faults control 96 allows parameters and faults to be added or removed. Once the information in service addition form 90 has been accepted, the changes are reflected in design view 100, as seen in FIG. 3B. The new operation, "requestQuote," referenced by 102, appears with the existing operation "requestLoan" 62. Referring now to FIG. 3C, WSDL view 110 indicates that the WSDL code has been updated to include the new operation "requestQuote," as indicated by 112, together with the selected XML Schema types for input and output. Referring now to FIG. 3C, Java view 120 indicates that the Java code has also been updated to include the corresponding Java method "requestQuote," as indicated by 122.

Figure 4A:
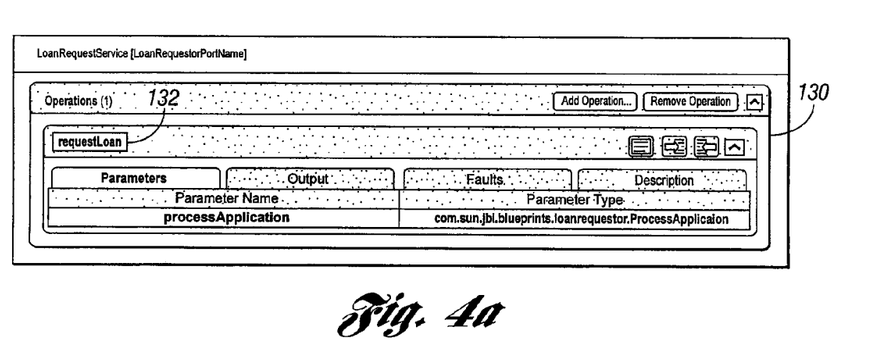

Referring now to FIGS. 4A-C, schematic diagrams illustrating a graphical user interface, WSDL view, and Java view, respectively, for name change operation according to an embodiment of the present invention are shown. As seen in FIG. 4A, user interface display 130 includes name box 132. Double clicking on name box 132 allows the operation name to be changed, in this case from "requestLoan," as shown, to "applyLoan." As seen in FIG. 4B, WSDL view 140 includes updated WSDL code, shown generally by 142, with the renamed operation "applyLoan." Likewise, as seen in FIG. 4C, Java view 150 has the corresponding method, shown generally by 152, renamed to "applyLoan."

Figure 5:
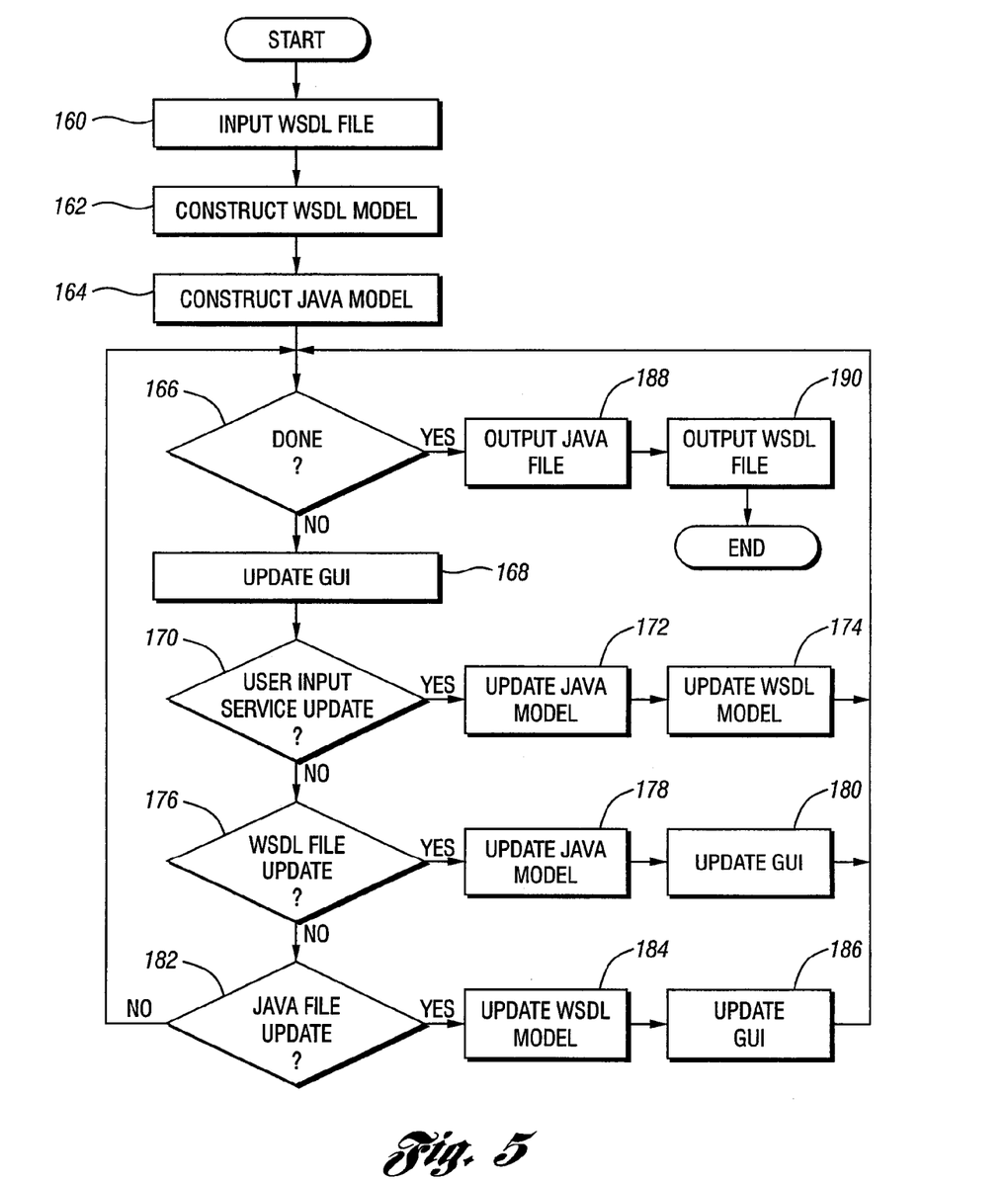
FIG. 5 is a flow diagram illustrating WSDL and Java file creation according to an embodiment of the present invention.

Referring now to FIG. 5, a flow diagram illustrating WSDL and Java file creation according to an embodiment of the present invention is shown. As will be appreciated by one of ordinary skill in the art, the operations illustrated are not necessarily sequential operations. The order of steps may be modified within the spirit and scope of the present invention and the order shown here is for logical presentation. Also, methods illustrated may be implemented by any combination of hardware, software, firmware, and the like, at one location or distributed. The present invention transcends any particular implementation and the embodiments are shown in sequential flow chart form merely for ease of illustration. Moreover, the present invention need not include every operation provided in the particular embodiment shown.

A WSDL file is input, as in block 160. A WSDL model is constructed from information contained in the file, as in block 162. A corresponding Java model is constructed including methods specified by operations in the WSDL model, as in block 164. A check is made to determine if a user is done, as in block 166. If not, a graphical user interface is updated, as in block 168, to reflect service information provided by the WSDL file.

Various options are available to interactively modify both the WSDL representation and the corresponding Java code. For example, a check is made to see if user input was provided to update the service, as in block 170. If so, the Java model is correspondingly updated, as in block 172, and the WSDL model is correspondingly updated, as in block 174. As another example, a check is made to see if the user updated the WSDL file, as in block 176. If so, the Java model is correspondingly updated, as in block 178, and the user interface is updated to show the change, as in block 180. Additionally, a check may be made to see if the user updated the Java file, as in block 182. If so, the WSDL model is correspondingly updated, as in block 184, and the user interface is updated to show the change, as in block 186.

Returning to block 166, if the user is done making changes, the Java file is outputted, as in block 188, and the WSDL file is outputted, as in 190. This may be accomplished by generating new files or by updating existing files. Alternatively, either or both of the Java file and the WSDL file may be updated incrementally as changes are made as in blocks 170, 176, and/or 182.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for iterative development of services comprising:
    a first memory for holding a WSDL model;
    a second memory for holding a Java model;
    a user interface operative to provide output to a user and accept input from the user; and
    control logic in communication with the first memory, the second memory, and the user interface, the control logic operative to
    (a) construct a WSDL model in the first memory based on a WSDL document,
    (b) for each service specified in the WSDL model, construct at least one corresponding service in the Java model and generate at least one display item on the user interface,
    (c) for each entry made by the user in the user interface in any one of the user interface display item, the WSDL model, or the Java model, update any two or more of the at least one corresponding user interface display item, the at least one corresponding service in the WSDL model, or the at least one corresponding service in the Java model;
    (d) produce a Java document from the Java model, and
    (e) produce an updated WSDL document.

2. The system of claim 1 wherein the user interface comprises graphical representations of operations and data structures provided by each specified service.

3. The system of claim 1 wherein the user interface accepts user input defining data from existing XML schema.

4. The system of claim 1 wherein the control logic is further operative to bind schema elements selected by the user to Java language artifacts.

5. The system of claim 1 wherein the control logic is further operative to update the Java model based on changes made to the Java document.

6. The system of claim 5 wherein the control logic is further operative to update the at least one corresponding service in the WSDL model and the at least one corresponding user interface display item based on the updated Java model.

7. The system of claim 1 wherein the control logic is further operative to update the WSDL model based on changes made to the WSDL document.

8. The system of claim 7 wherein the control logic is further operative to update the at least one corresponding service in the Java model and the at least one corresponding user interface display item based on the updated WSDL model.

9. A computer implemented method for iteratively developing web services comprising:
    accepting as input at least one web service specified by WSDL code;
    creating output code corresponding to each of the at least one inputted web service;
    displaying on a user interface a graphical display item corresponding to each of the at least one inputted web service;
    accepting from the user interface user input to any one of the graphical display item, output code, or WSDL code modifying the at least one inputted web service and updating any two or more of the WSDL code, the output code, or the graphical display item to reflect the user input; and
    generating at least one of a WSDL document and an output code document including the at least one modified web service.

10. The computer implemented method of claim 9 wherein the input to the WSDL code modifying the at least one inputted web service is reflected in an update of the graphical display item, the output code, or both.

11. The computer implemented method of claim 9 wherein the input to the output code modifying the at least one inputted web service is reflected in an update of the graphical display item, the WSDL code, or both.

12. The computer implemented method of claim 9 wherein the input to the graphical display item modifying the at least one inputted web service is reflected in an update of the WSDL code, the output code, or both.

13. The computer implemented method of claim 9 wherein the output code is Java code.

14. A computer readable storage medium containing instructions for execution on a computer, the computer readable storage medium comprising:
    computer code for accepting as input at least one web service specified by WSDL code;
    computer code for creating output code corresponding to each of the at least one inputted web service;
    computer code for displaying a graphical display item corresponding to each of the at least one inputted web service;
    computer code for accepting user input in any one of the graphical display item, the output code or the WSDL code modifying the at least one inputted web service;
    computer code for updating any two or more of the WSDL code, the output code, or the graphical display item to reflect the user input; and
    computer code for generating at least one of a WSDL document and a Java document including the at least one modified web service.

15. The computer readable storage medium of claim 14 wherein the input in the WSDL code modifying the at least one inputted web service is reflected in an update of the graphical display item, the output code, or both.

16. The computer readable storage medium of claim 14 wherein the input in the output code modifying the at least one inputted web service is reflected in an update of the graphical display item, the WSDL code, or both.

17. The computer readable storage medium of claim 14 wherein the input in the graphical display item modifying the at least one inputted web service is reflected in an update of the WSDL code, the output code, or both.

18. The computer readable storage medium of claim 14 wherein the output code is Java code.

\* \* \* \* \*